United States Patent [19]

DiMarco et al.

[11] Patent Number: 5,408,208

[45] Date of Patent: Apr. 18, 1995

[54] ELECTRICALLY TRIPPED MECHANISM FOR KNIFE BLADE SWITCHES

[75] Inventors: Bernard DiMarco, Lilburn; Bradley J. Lewis; Bruce D. Guiney, both of Tucker, all of Ga.

[73] Assignee: Siemens Energy & Automation, Inc., Alpharetta, Ga.

[21] Appl. No.: 965,144

[22] Filed: Oct. 22, 1992

[51] Int. Cl.⁶ .......................................... H01H 75/00
[52] U.S. Cl. ..................................... 335/14; 200/400
[58] Field of Search ...................... 335/14, 20; 361/64; 340/638, 639; 200/400

[56] References Cited

U.S. PATENT DOCUMENTS

| | | |
|---|---|---|
| 3,602,676 | 8/1970 | Mrenna .......................... 200/153 G |
| 3,684,850 | 8/1972 | Kaderbeck et al. . |
| 3,860,910 | 1/1975 | Hudson . |
| 3,872,273 | 3/1975 | Netzel ........................... 200/153 G |
| 4,639,612 | 1/1987 | Bowman-Jones . |
| 4,804,862 | 2/1989 | Bowman-Jones et al. . |
| 5,301,083 | 4/1994 | Grass et al. ............................ 361/64 |

*Primary Examiner*—Lincoln Donovan
*Attorney, Agent, or Firm*—Richard M. Ludwin; Peter A. Luccarelli, Jr.

[57] ABSTRACT

A remote tripping mechanism for use with a spring loaded safety switch. In a preferred embodiment, the mechanism is made up of two cams with a compression type trip spring anchored between them. The two cams are held in the "normal position" (the spring compressed) by a latch. In this position, the switch operates in the same manner as a conventional safety switch. A trip lever connected to a solenoid is positioned such that it is unobtrusive when the switch is turned ON and OFF. When the switch is in the ON position and power is applied to the solenoid, the trip lever unlatches the latch and the two cams separate. The first cam engages and lifts the bail, turning the switch OFF. The cams are reset by turning the handle to the OFF position. This compresses the trip spring and resets the latch.

15 Claims, 5 Drawing Sheets

ELECTRICALLY TRIPPED MECHANISM FOR KNIFE BLADE SWITCHES

I. BACKGROUND OF THE INVENTION a. Field of the Invention

This invention relates to electrical safety switches.

b. Related Art

Environments requiring the switching of electrical circuits will often call for the use of a safety switch. For example, safety switches are commonly used to control the power input to machinery or as the power switch to one or more areas of the physical plant.

An example of a conventional spring operated electrical safety switch is shown in FIG. 1. The switch is provided with movable contact carriers 102, each of which holds an electrically conductive contact 104. The contact carriers 102 are mounted on a bail 106, which is pivotally mounted in the switch housing 108. Pairs of stationary electrical contacts 110, 112 are also mounted within the switch housing 108 so as to receive the movable contacts 104 when the switch is "ON". One electrical contact 110 in each pair is connected to a line voltage while the other electrical contact 112 in each pair is connected to a load.

A handle 114 is connected to the bail 106 by way of a loading/actuating mechanism 115. In the switch of FIG. 1, the loading/actuating mechanism comprises a drive shaft 116 (coupled to the handle 114) and an operating cam 118. A spring 120 is mounted to the switch housing 108 and coupled to the bail 106 so as to bias the bail 106 in a position such that each of the movable contacts 104 will be brought into mechanical and electrical connection with a corresponding pair of the stationary contacts 110, 112. A rod 122, centered within the spring transfers the force of the spring to the cam 118. By pulling the handle 114 down, the user loads the spring 120 which, in turn, pivots the bail 106 into an "over center" position away from the stationary contacts, thus leaving the switch in an "OFF" or "open" position.

When the handle 114 is moved in an upward direction by the user, the cam 118 pivots the bail 106. Once pivoted beyond the center position, in the direction of the stationary contacts 110, 112, the bail 106 slips from the handle 114 as the spring 108 pushes the bail 106 into place. When the bail is in place in it's spring biased position, the movable contacts 104 each make mechanical and electrical connection between a corresponding pair of stationary contacts 110, 112, thus placing the switch into a "ON" or "closed" position.

An auxiliary switch 124 may be mounted in a position within the housing such that the heel of the bail 106 will cause the auxiliary switch 124 to be "closed" just after the bail 106 and contacts 104 are pushed into a "closed" position by the spring 120. The auxiliary switch 124 is typically used to provide a positive indication of the condition (OPEN or CLOSED) of the safety switch.

A more detailed view of the loading/actuating mechanism 115 of FIG. 1 is shown in FIG. 2. The cam 118 includes a tab having a notch 118a. The coil portion of a torsion spring 202 is positioned over the drive shaft 116. The formed leg 202a of the torsion spring 202 is hooked under the adjacent leg of the bail 106. The straight leg 202b of the torsion spring 202 is inserted into the notch 118a provided for that purpose in the cam 118.

The bail 106 is placed between an upper stop 118b and a lower stop 118c of the cam 118. The torsion spring 202 exerts a force on the bail 106 holding it against the upper stop 118b on the cam 118. This prevents the movable contacts 104 from be placed, by gravity or mechanical shock, into inadvertent engagement with the stationary contacts 110, 112. A handle biasing spring (not shown) can also be provided so as to ensure that the position of the handle 114 is indicative of the position of the cam 118.

In many applications, it would be advantageous to be able to turn off the safety switch from a remote location. Remote opening is known, for example, in circuit breakers and molded case switches. Thus, while the remote control of switches is known in the art, what is needed is a mechanism that is specifically suited for the structure of spring operated safety switches.

II. SUMMARY OF THE INVENTION

In light of the above, the present invention comprises a remotely actuated tripping mechanism for use with a spring operated safety switch. In a preferred embodiment, the mechanism is made up of two cams with a compression type trip spring anchored between them. The two cams are held in the "normal position" (the spring compressed) by a latch. In this position, the switch operates in the same manner as the conventional safety switch of FIG. 1. A trip lever connected to a solenoid is positioned such that it is unobtrusive when the switch is turned ON and OFF. When the switch is in the ON position and a voltage is applied to the solenoid, the trip lever unlatches the latch and the two cams separate. The first cam engages and lifts the bail, moving the switch OFF. The cams are reset by turning the handle to the OFF position. This compresses the trip spring and resets the latch.

III. BRIEF DESCRIPTION OF THE DRAWING

The present invention will be better understood by reference to the drawing, in which.

Like reference numerals appearing in more than one FIGURE represent like elements.

IV. DETAILED DESCRIPTION OF THE PREFERRED EMBODIMENT

Figure 1:
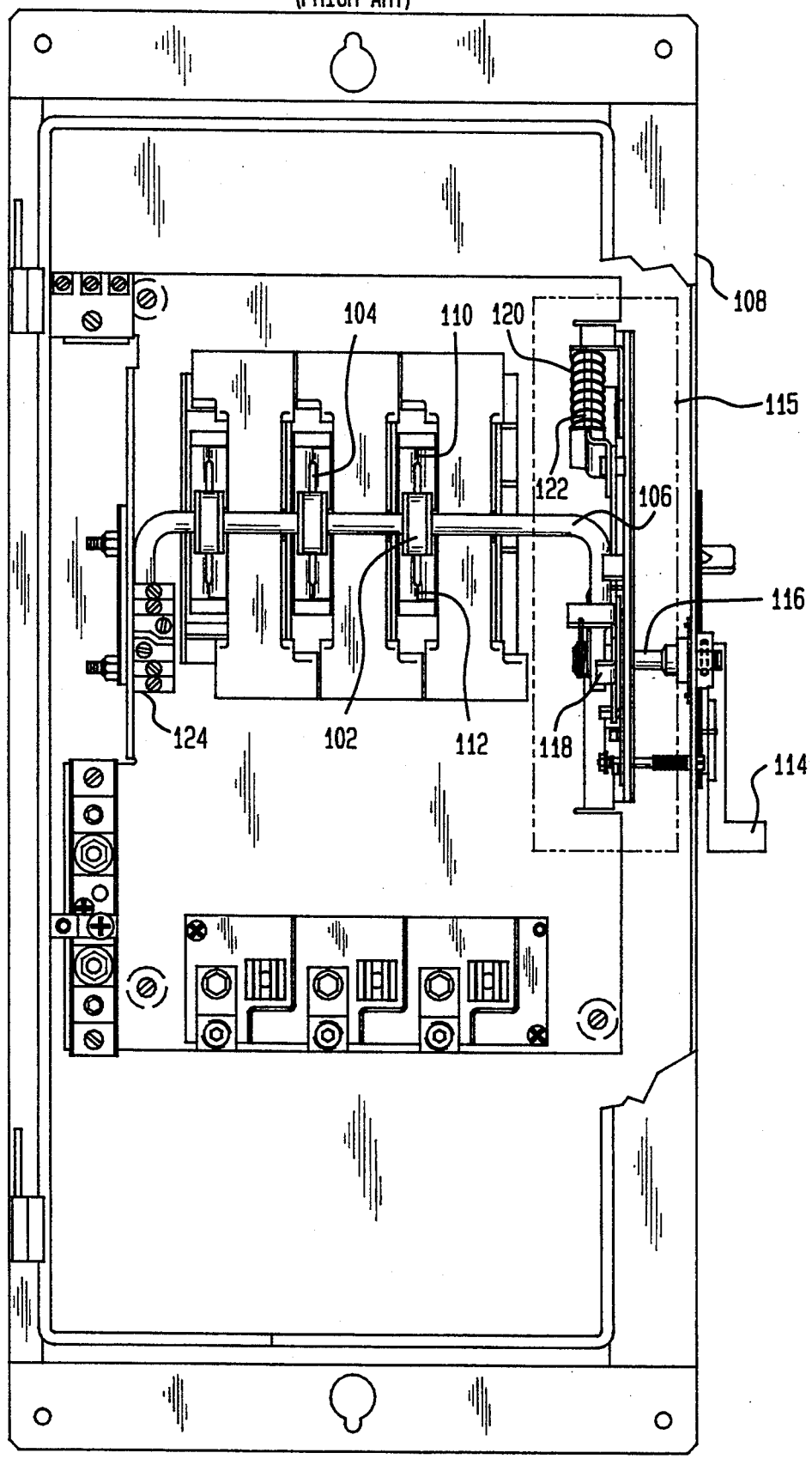
FIG. 1 is a front view of a prior art safety switch.
Figure 3:
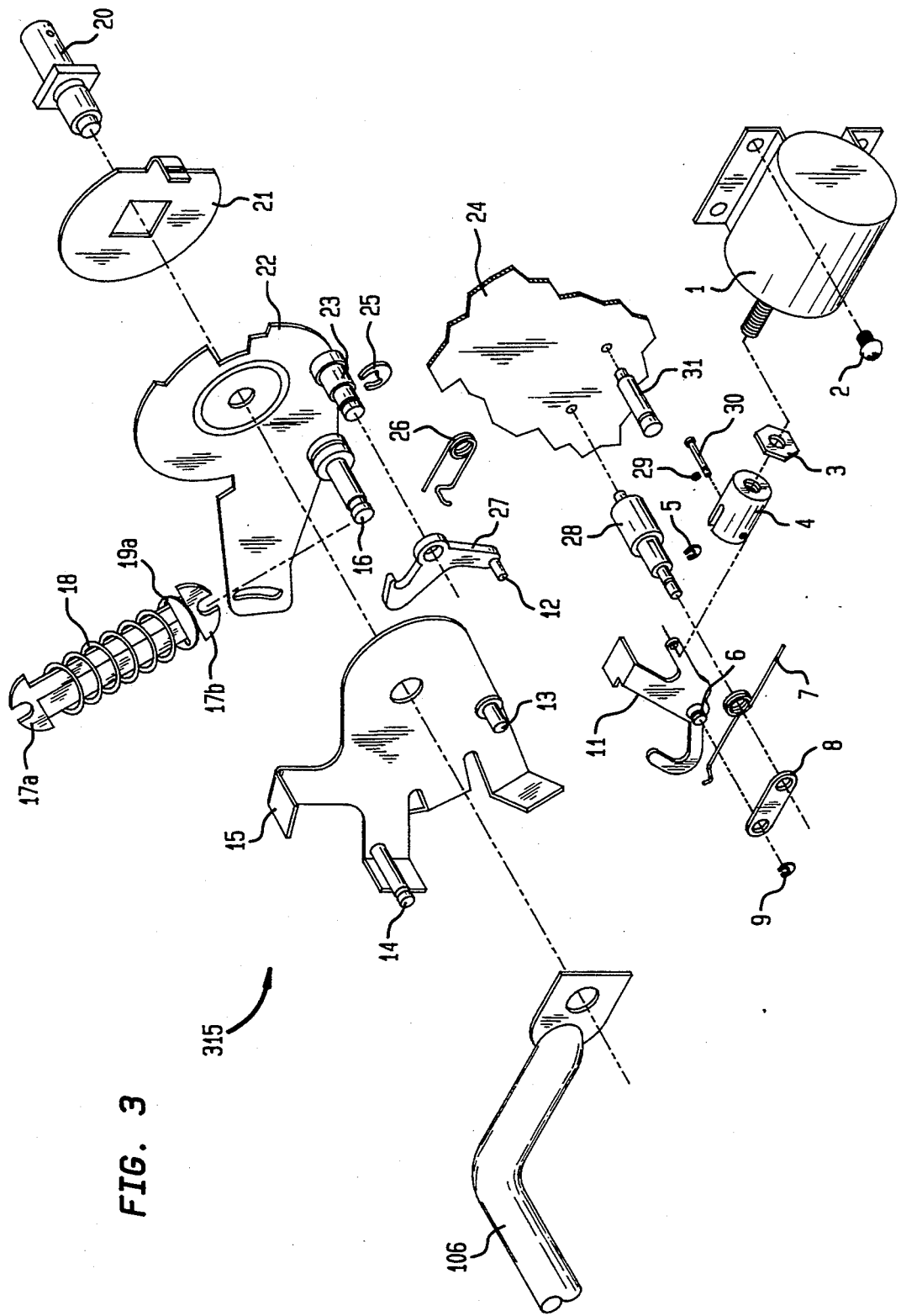
FIG. 3 is an enlarged exploded view of a loading/actuating mechanism, according to an embodiment of the present invention.
Figure 4:
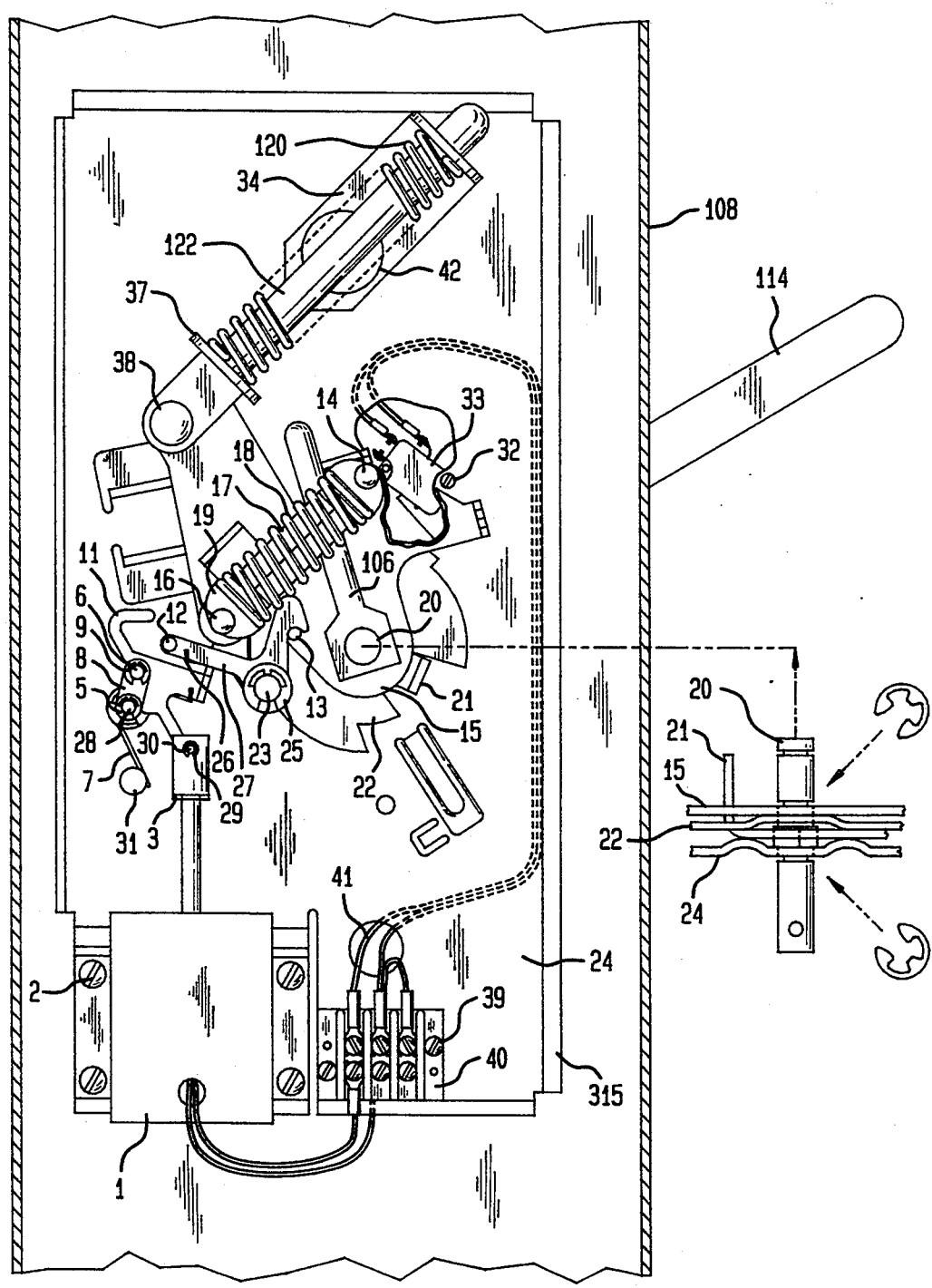
FIG. 4 is a side view of the loading/actuating mechanism of FIG. 3.

A loading/actuating mechanism 315 according to an embodiment of the present invention is illustrated in FIGS. 3 and 4. According to an embodiment of the present invention, the mechanism 315 of FIGS. 3 and 4 replaces the loading/actuating mechanism 115 in the knife blade safety switch of FIG. 1.

The mechanism of FIGS. 3 and 4 comprises two cams 15, 22 with a trip spring 18 anchored between them. The spring 18 is held in position by two spring guides 17a, 17b. Two washers 19a, 19b (only the one of which is shown in FIG. 3) can be optionally provided to serve as bearing surfaces for each end of the spring 18. Each spring guide 17a, 17b rotates about a shoulder rivet. A first shoulder rivet 14 is assembled to the first cam 15 and a second shoulder rivet 16 is assembled to the second cam 22. The position of the shoulder rivets 14, 16 is determined by the force vector of the trip spring 18. The two cams 15, 22 are held together by a latch 27 which rotates about a latch pivot rivet 23 assembled to the second cam 22. The latch 27 is held in place by a "e" ring 25. A second spring 26 located about the latch pivot rivet 23 biases the latch 27 toward the latch pin 13 which is assembled to the first cam 15. The latch 27 holds the first and second cams 15, 22 together and keeps the trip spring 18 compressed.

A trip lever 11 is connected by a clevis 4 and a pin 30 to a solenoid 1. A jam nut 3 locks the clevis 4 in place. An "e" ring 29 holds the pin 30 in place. A connecting link 8, which rotates about the lever pivot 28 assembled to the mech plate 24, attaches to a link pin 6, which is assembled to the trip lever 11. The connecting link is held in place by "e" rings 5, 9. The solenoid 1 is mounted to the mech plate 24 by machine screws 2. A third spring 7 is disposed around the lever pivot 28. One end of the third spring 7 is attached to the trip lever 11. The other end of the third spring 7 is attached to a stop pin 31. The third spring 7 serves to bias the trip lever 11 and the solenoid plunger to their resting positions, out of the way of the latch trip pin 12.

Figure 2:
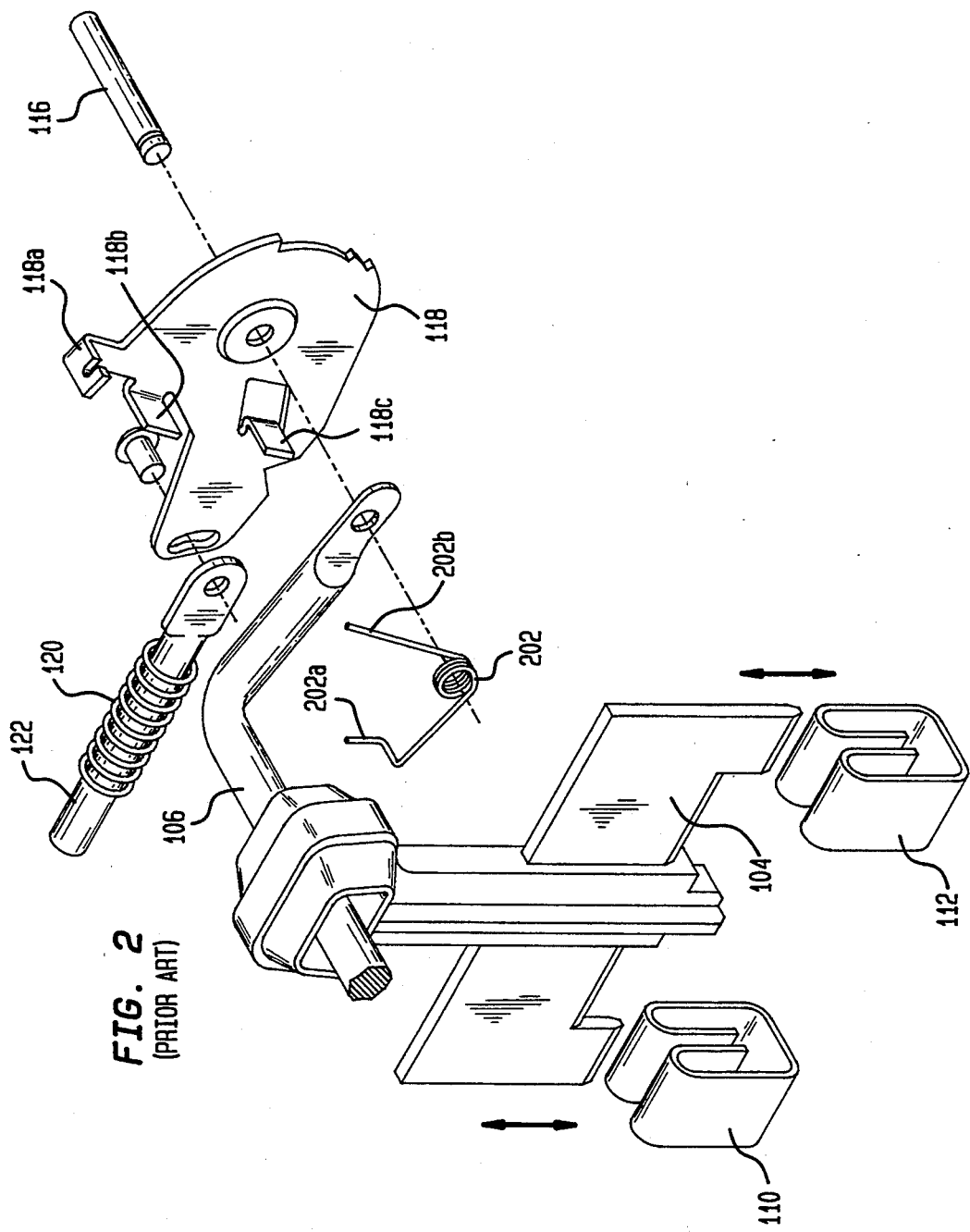
FIG. 2 is an exploded view of the loading/actuating mechanism of FIG. 1.

The operation of the present loading/actuating mechanism will be beet understood by reference to FIG. 4. When the latch 27 is engaged with the latch pin 13, the trip spring 18 is compressed and the two cams 15, 22 move and work as one unit. The handle 114 is connected to the drive shaft 20 by a pin (not shown). Moving the handle upward rotates the drive shaft 20 which, in turn, moves the actuator 21. The tab on the actuator 21 engages the cam 22, thus forcing both cams 15, 22 to rotate counter clockwise. This causes the toggle spring guide 122 (which is connected to the cam 22 by a pin 38) and the toggle spring stop 34 (which rotates about a pin 42 assembled to the mech plate 24) to rotate, causing the toggle spring 120 to compress. The tab of the cam 15 engages the bail 106, thus moving it. The movable switch contacts 104 (FIGS. 1 and 2) are coupled to the bail 106 via the contact carrier 102 and move with the bail. Energy is transferred from the handle to the toggle spring 120 until the mechanism reaches its toggle position. At the toggle position, the stored energy in the toggle spring 120 takes over to drive the bail/movable contacts into the stationary contacts 110, 112 (FIGS. 1 and 2) and into an ON position. Reverse motion of the handle moves the switch mechanism to an OFF position.

When the switch is in the ON position, and power is applied to the solenoid 1, the solenoid plunger moves the trip lever 11. The trip lever 11 engages the latch trip pin 12, rotating the latch 27, which then disengages from the latch pin 13. The stored energy of the trip spring 18 forces the first cam 15 to move clockwise. The first cam 15 engages and lifts the bail 106, which has the moveable contact carrier 102 of the switch attached, thus turning the switch off.

When the mechanism has been tripped, a tab on the first cam 15 engages a normally closed momentary switch 33 which is mounted to the mech plate 24 by screws 32. When the momentary switch 33 is forced open by the tab, it opens the solenoid circuit. This feature allows power to be provided to the solenoid only as required. After tripping, power is removed from the solenoid so that it does not overheat. Also, once the complete mechanism is in the OFF position power can not be applied to the solenoid. The above-described "cut-off" mechanism is advantageous because returning the switch to the ON position, while power is applied to the solenoid, could damage the trip lever.

When power is removed from the solenoid 1 the bias spring 7 moves the trip lever 11 and the solenoid plunger back to their resting positions.

The mechanism is reset manually by turning the handle 114, which is in the on position (i.e. up), downward. This rotates the drive shaft 20 which moves the actuator 21. The tab on the actuator 21 engages the second cam 22 and forces it to rotate clockwise, compressing the trip spring 18 and resetting the latch 27.

The above-described embodiment provides a safety advantage in that the handle does not move when the contacts are forced OFF. In other words, the handle does not come slamming down when the switch is tripped remotely. This protects people who may be standing near the enclosure when the switch is tripped remotely.

It should be understood that the solenoid may be replaced by any device that could supply the work necessary to trip the latch, for example an air cylinder/valve combination.

Figure 5:
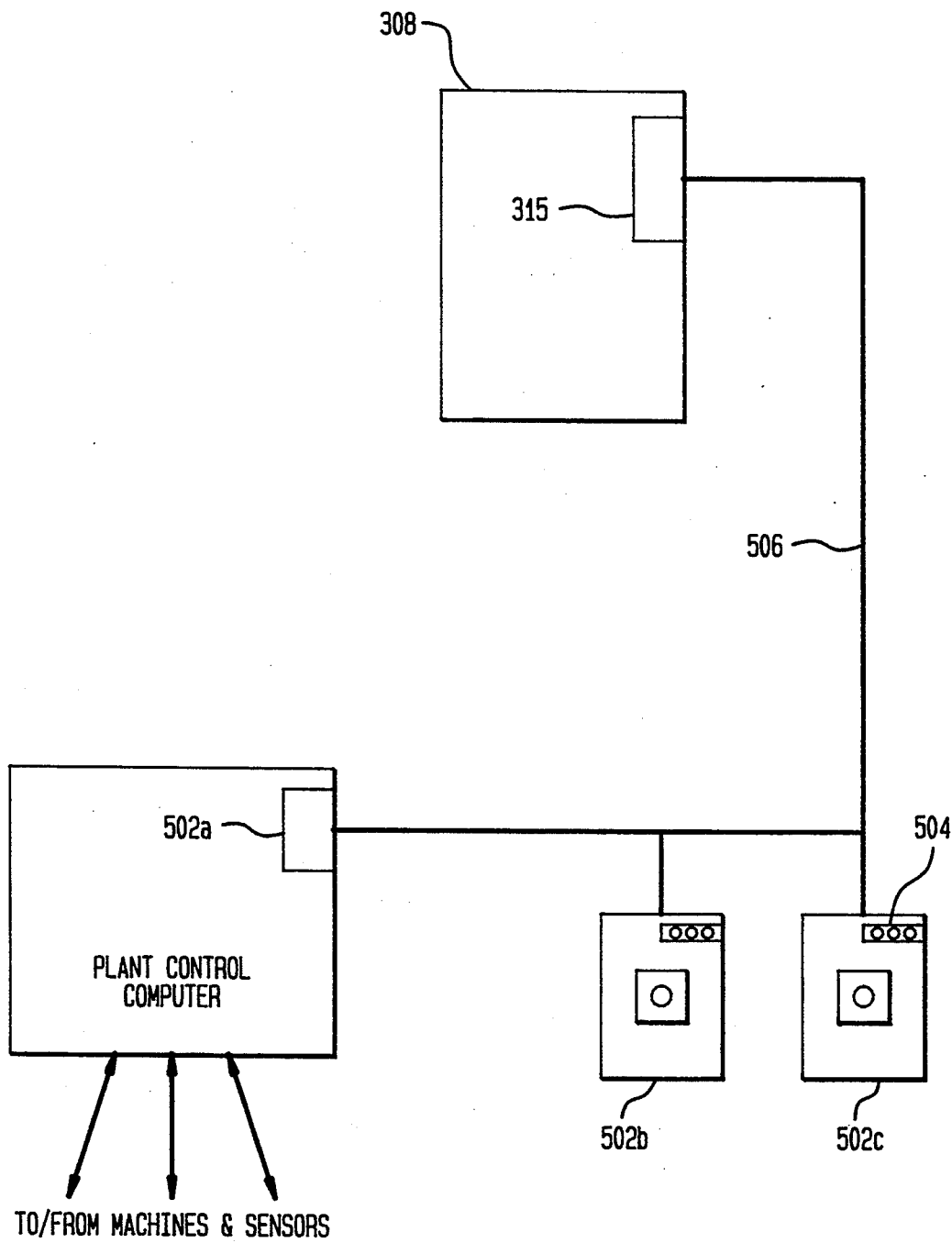
FIG. 5 is a block diagram of a safety switch having a loading/actuating mechanism according to an embodiment of the present invention, in a network with a plurality of remote switches.

The remote control stations are illustrated in FIG. 5. Advantageously, any number of remote control mechanisms can be connected to the tripping mechanism 315 such that the safety switch can be turned OFF from any station. The remote control stations can be of a number of types. Some of the stations can be activated by a control system. For example, a plant control computer 500 could be connected to one of the stations 502a so as to trip the spring actuated safety switch 308 when a problem is detected (e.g. there is a fire in the plant, a motor (being supplied power via the switch) is overheating or a particular time of day has arrived and the switched apparatus will be shut down. Other stations can be user activated. For example, panic switches 502b, 502c can be provided in several areas from which an apparatus can be turned off.

The switch housing and each of the user operable remote control stations can also include a number of visible indicators 504, such an annunciator panel or light emitting diodes. In this embodiment, the control bus 506 connected to each switch, carries the solenoid actuation signal and an encoded signal indicating which remote station has been activated.

The control bus 506 can also include a feedback line from the auxiliary switch 124, which opens along with the safety switch and indicates when the safety switch has been tripped. The feedback line can be used to activate an indicator at the user operable remote switches. Thus, by looking at the indicators, a user can quickly tell the switch has been tripped and from where.

The feedback line can also be provided to the plant control computer 504. By using the feedback line in conjunction with the encoded bus signals, the plant control computer 504 can determine both the condition of the safety switch 308 and, if OFF, from where it was tripped.

Now that the invention has been described by way of the preferred embodiment, various enhancements and improvements which to not depart from the scope and spirit of the invention will become apparent to those of skill in the art. Thus it should be understood that the preferred embodiment has been provided by way of example and not by way of limitation. The scope of the invention is defined by the appended claims.

We claim:

1. A power switching system comprising:
   a spring operated safety switch having:
   a housing;
   a drive shaft pivotally coupled to the housing;
   a handle coupled to the drive shaft and pivotally mounted to the housing;
   a bail pivotally mounted to the housing;
   a first electrically conductive contact coupled to the bail;
   a second electrically conductive contact mounted in the housing so as to make an electrical connection with the first electrically conductive contact when the bail is in a closed position;
   a first cam coupled to the drive shaft and to the bail;
   a second cam coupled to the drive shaft and to the handle;
   a spring coupled to the first cam and the second cam, such that when the handle is rotated in a first direction, the bail is moved to a closed position and the spring is loaded;
   an actuator, coupled to one of the first and second cams, the actuator comprising means for decoupling the first cam from the second cam and means for moving the bail from the closed position to an open position in response to an electrical signal from a remote source;
   the spring operated safety switch further having auxiliary means for generating a signal indicative of an on/off condition of the safety switch; and,
   a first user activatable control station, disposed remotely from the safety switch and coupled to the actuator; the control station comprising (a) means, responsive to user manual control, for generating the electrical signal that will cause the actuator to turn off the safety switch and (b) means, coupled to the auxiliary means, for visually indicating the on/off condition of the safety switch.

2. The power switching system of claim 1 further comprising a second user activatable control station, disposed remotely from the safety switch and coupled to the first user activatable control station and the actuator,
   wherein, both the first user activatable control station and the second user activatable control station comprise means for indicating from which control station the safety switch was turned off.

3. An electrical switch, comprising:
   a housing;
   a drive shaft pivotally coupled to the housing;
   a handle coupled to the drive shaft and pivotally mounted to the housing;
   a bail pivotally mounted to the housing;
   a first electrically conductive contact coupled to the bail;
   a second electrically conductive contacts mounted in the housing so as to make an electrical connection with the first electrically conductive contact when the bail is in a closed position;
   a first cam coupled to the drive shaft and to the bail;
   a second cam coupled to the drive shaft and to the handle;
   an energy storage spring coupled to the first cam and the second cam, such that when the handle is rotated in a first direction, the bail is moved to a closed position and the spring is loaded;
   actuator means, coupled to at least one of the first and second cams, the actuator means comprising means for decoupling the first cam from the second cam and means for moving the bail from the closed position to an open position in response to an electrical signal from a remote source.

4. The electrical switch of claim 3, further comprising:
   control means, disposed remotely from the housing, for generating the electrical signal.

5. The switch of claim 3 further comprising an auxiliary switch mounted in the housing and actuated by the bail.

6. The switch of claim 3, further comprising:
   a cut-off switch mounted in the housing and coupled to the actuation means, for cutting off the signal from the actuation means when the safety switch is turned off.

7. The switch of claim 3 wherein the electrical contacts form a knife blade switch.

8. The switch of claim 3, further comprising:
   control means, coupled to the actuator means and disposed remotely from the housing, for signaling the actuator means to move the bail from the "on" position, said control means comprising means for being activated by the remote user.

9. The switch of claim 3 further comprising:
   a plant control computer disposed remotely from the housing and being coupled to the actuator means and a plurality of plant sensors, the plant control computer comprising means for signaling the actuator means to release the bail from the "on" position when one of the plant sensors indicates a problem condition affecting a device controlled by the switch.

10. A shunt-trip switch comprising:
    a knife-blade switch having a housing including a pair of separable contacts engageable from an open position to a closed position;
    a bail with an overcenter operating mechanism, pivotally coupled to the housing and coupled to one of the contacts for causing contact engagement;
    a mech plate coupled to the housing;
    a drive shaft pivotally coupled to the mech plate;
    a first cam coupled to the drive shaft, for pivoting the bail;
    a second cam coupled to the drive shaft generally parallel to the first cam and capable of relative motion with respect to the first cam;
    an energy storage spring coupled between the first and second cams for causing relative motion therebetween;
    a latch for selectively locking the first and second cams relative to each other and for unlocking the cams when tripped;
    an actuator for tripping the latch in response to an actuation signal; and
    a handle coupled to the drive shaft for selectively pivoting the bail and for storing energy in the spring.

11. The switch of claim 10, further comprising:
    control means, disposed remotely from the housing, for generating the actuation signal.

12. The switch of claim 10 further comprising an auxiliary switch mounted in the housing and actuated by the bail.

13. The switch of claim 10, further comprising:
a cut-off switch mounted in the housing and coupled to the actuator, for cutting off the actuation signal to the actuator when the safety switch is turned off.

14. The switch of claim 10, further comprising:
control means, coupled to the actuator and disposed remotely from the housing, for signaling the actuator to move the bail from a contact engagement position, said control means comprising means for being activated by the remote user.

15. The switch of claim 10 further comprising: a plant control computer disposed remotely from the housing and being coupled to the actuator and a plurality of plant sensors, the plant control computer comprising means for signaling the actuator to release the bail from a contact engagement position when one of the plant sensors indicates a problem condition affecting a device controlled by the switch.

* * * * *